(12) United States Patent
Ohno et al.

(10) Patent No.: US 6,628,602 B2
(45) Date of Patent: Sep. 30, 2003

(54) OPTICAL INFORMATION RECORDING MEDIUM

(75) Inventors: Hirotoshi Ohno, Yokohama (JP); Yasuyoshi Kawashima, Ayase (JP)

(73) Assignee: Victor Company of Japan, Kanagawa-ken (JP)

( * ) Notice: Subject to any disclaimer, the term of this patent is extended or adjusted under 35 U.S.C. 154(b) by 216 days.

(21) Appl. No.: 09/912,429

(22) Filed: Jul. 26, 2001

(65) Prior Publication Data
US 2002/0024923 A1 Feb. 28, 2002

(30) Foreign Application Priority Data
Jul. 27, 2000 (JP) .................................... 2000-226774

(51) Int. Cl.[7] ............................. G11B 7/24; G11B 5/85
(52) U.S. Cl. ................................ 369/275.3; 369/53.24
(58) Field of Search ........................ 369/275.3, 30.11, 369/30.04, 30.05, 30.19, 30.03, 30.07, 53.2, 53.41, 53.24; 711/1, 4, 100

(56) References Cited

U.S. PATENT DOCUMENTS

| | | | | |
|---|---|---|---|---|
| 5,471,441 A | * | 11/1995 | Nonaka et al. | 369/32 |
| 5,559,778 A | * | 9/1996 | Inokuchi et al. | 369/58 |
| 5,721,856 A | * | 2/1998 | Takeuchi | 369/32 |
| 5,889,742 A | * | 3/1999 | Kuroda | 369/48 |
| 6,091,686 A | * | 7/2000 | Caffarelli et al. | 369/58 |
| 6,327,228 B1 | * | 12/2001 | Tani | 369/275.3 |
| 6,411,574 B1 | * | 6/2002 | Su et al. | 369/275.3 |
| 6,438,084 B2 | * | 8/2002 | Kawashima et al. | 369/275.3 |
| 6,473,380 B1 | * | 10/2002 | Takahashi | 369/59.25 |
| 6,549,489 B1 | * | 4/2003 | Van Der Enden et al. | 369/30.11 |

* cited by examiner

*Primary Examiner*—Tan Dinh
(74) *Attorney, Agent, or Firm*—Connolly Bove Lodge & Hutz LLP (57) ABSTRACT

An optical information recording medium having a lead-in area complying with the PW (Packet Writing) format and such a lead-in area is pre-recorded with a lead-in information prior to any recording. At a second time recording session, the end of recording information is only recorded in an address block for a last packet #2, and the end of recording information in an address block for a packet #1 which becomes the last packet at a first time recording session is made to be non-readable. At a third time recording session, a packet with an address block, wherein the end of recording information is recognized, is determined to be the last packet #2 and the recording starts from the packet #3, so that the information recorded in the medium before finalization can be lead-out by a CD-ROM disc drive.

7 Claims, 9 Drawing Sheets

| Link Block | Run in Block 1,2,3,4 | ADR Blocks TOTAL | Dummy Blocks | Run-out Block 1,2 |
|---|---|---|---|---|
| 1Blk | 4Blk | 100Blk | 10Blk | 2Blk |

| ADR Block #101 | ADR Block #100 | -- | ADR Block #x | -- | ADR Block #6 | ADR Block #5 | ADR Block #4 | ADR Block #3 | ADR Block #2 |
|---|---|---|---|---|---|---|---|---|---|
| O | O | | O | | O | O | × | × | × |

Readable    Unreadable

The direction of data search of CD-ROM drive →

Fig. 1

| Link Block | Run in Block 1,2,3,4 | User Data Blocks | ADR Block | Dummy Blocks | Run-out Block 1,2 |
|---|---|---|---|---|---|
| 1Blk | 4Blk | 32Blk | 1Blk | 10Blk | 2Blk |

| Link Block | Run-in Block1 | Run-in Block2 | Run-in Block3 | Run-in Block4 | User Data Blocks | Run-out Block1 | Run-out Block2 |
|---|---|---|---|---|---|---|---|
| 1Blk | 1Blk | 1Blk | 1Blk | 1Blk | 32Blk | 1Blk | 1Blk |

OPTICAL INFORMATION RECORDING MEDIUM

BACKGROUND OF THE INVENTION

1. Field of the Invention

The present invention relates to an optical information recording medium, which has a structure of recording information by using the packet writing recording format for a CD-R disc and a structure capable to read out recorded information from the top through the last recorded packet by a CD-ROM drive even when a recordable area still remains in such a recording medium.

2. Description of the Related Art

A recordable type of information recording medium such as a CD-R disc became popular recently that a recorded disc can be treated equally as a CD-ROM disc and that the recorded information can not be interpolated.

There are four types of recording format for the CD-R disc such as DAO (Disc At Once), SAO (Session At Once), TAO (Track At Once) and PW (Packet Writing).

Figure 8:
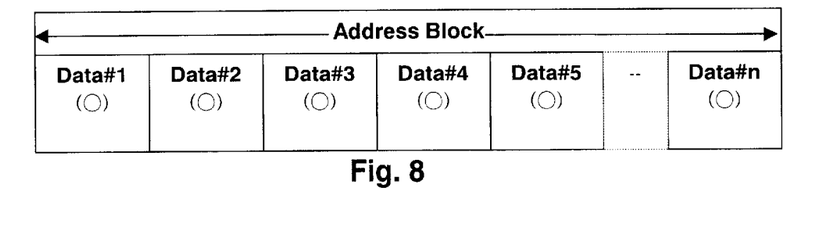
FIG. 8 is a diagram for explaining a data structure of an address block before overwriting operation in accordance with a third embodiment of the present invention.

FIG. 8 is a diagram for explaining the recording format of DAO. This format is the basic recording format for a CD-R disc and it has almost the same structure of the recording format for a read-only CD disc such as a CD-DA disc and a CD-ROM disc.

As shown in FIG. 8, a CD-R disc is composed of an area A, typical of a CD-R disc, and an area B, common to a read-only CD disc. The area A consists of a ① PCA (Power Calibration Area) area and a ② PMA (Program Memory Area) area. The ① PCA area is an area for determining an optimum recording laser power for a CD-R disc, and the ② PMA area is a data recording area for recording a temporal lead-in information before writing the lead-in information in a ③ lead-in area actually. As the recording formats of DAO and SAO write information in the ③ lead-in area and a ⑤ lead-out area simultaneously with a ④ program area, it is not necessary to write the temporal lead-in information in the ② PMA area. As the area A does not directly impact the following, the detailed description for the area A is omitted.

The area B consists of the ③ lead-in area, the ④ program area and the ⑤ lead-out area, and is called a "session". The ③ lead-in area is an area for recording a starting time of recording information in the ④ program area and the ⑤ lead-out area and for recording a type of data to be recorded in the ④ program area. The ④ program area is composed of a plurality of tracks and each track is recorded with an user information to be recorded. The ⑤ lead-out area is recorded with an information indicating the end of the ④ program area.

The area B of the DAO format has the same structure of the recording area of a read-only CD disc as described above to enable the CD-R disc recorded in the DAO format being lead-out by a CD-ROM disc drive.

Figure 9:
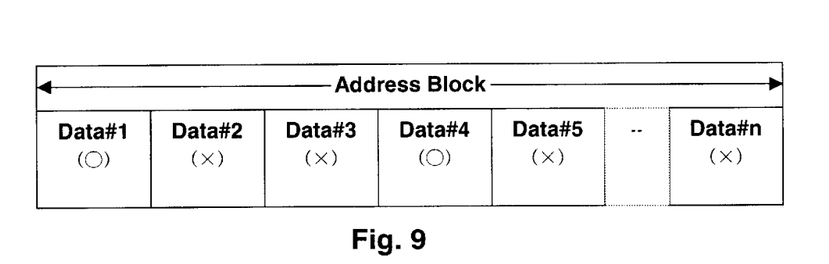
FIG. 9 is a diagram for explaining a data structure of an address block after overwriting operation in accordance with the third embodiment of the present invention.

FIG. 9 is a diagram for explaining the SAO format. The SAO format is a format developed from the DAO format and is for recording information repeatedly in a session unit of the ③ lead-in area, the ④ program area and the ⑤ lead-out area. In the case of FIG. 9, it shows two sessions indicated as an area B'. The first session consists of ③ lead-in area, ④ program area and ⑤ lead-out area and the second session consists of ③' lead-in area, ④' program area and ⑤' lead-out area. In the SAO format, as the recording operates in the session unit, a recorded CD-R disc can be used for reading out information by a CD-ROM disc drive or a CD-R disc drive for multi-section application.

The TAO format is developed from the SAO format to reduce an area unavailable for user data in the SAO format by dividing each session area in a track unit and to make such an area recordable.

More specifically, the lead-out area and the lead-in area are necessary in one session for recording information in the session unit by the SAO format, and further, in the case of FIG. 9, such the format requires 90 seconds for recording in the ⑤ lead-out area and 60 seconds for recording in the ③' lead-in area. The TAO format is to reduce these areas unavailable for user data recording. Consequently, there is a benefit of recording more user information in the ④ program area. Generally, the TAO format has one session and divides one session into a plurality of tracks and records information in the track unit.

Figure 10:
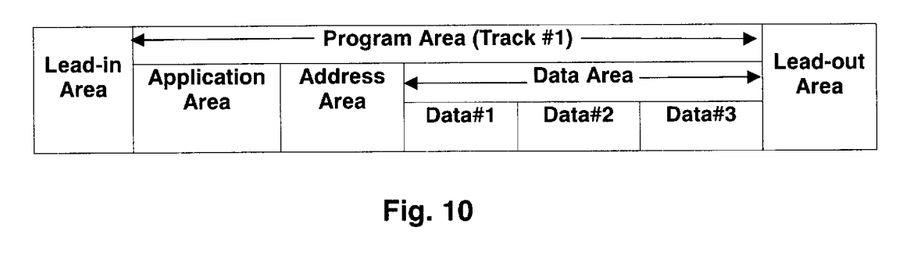
FIG. 10 is a diagram for explaining a first recording format in accordance with a fourth embodiment of the present invention.

FIG. 10 is a diagram for explaining recording format of the TAO format. In FIG. 10, the TAO format has one session and the ④ program area is composed of three tracks. Each track is ④-1 track #1, ④-2 track #2, and ④-1 track #3 from the top. The recording is carried out in the order of track #1, #2, and #3 in the track unit.

After the recording in the ④-3 track #3 is completed, the lead-in information is recorded in the ③ lead-in area and the lead-out information in the ⑤ lead-out area respectively, which is called finalization. As a result of this finalization, a CD-R disc recorded by the TAO format can be used for reading out information by a CD-ROM disc drive.

Figure 11:
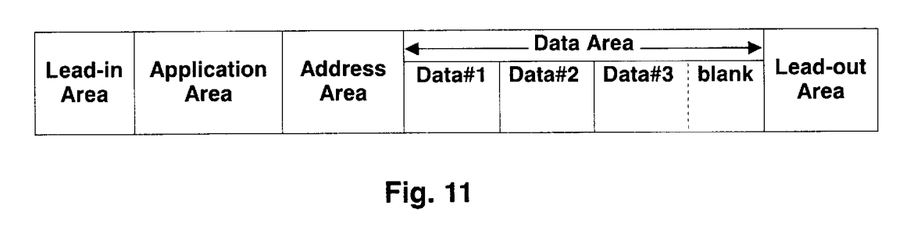
FIG. 11 is a diagram for explaining a second recording format in accordance with the fourth embodiment of the present invention.

FIG. 11 is a diagram for explaining recording format of the PW format. The PW format is a recording format subdivides the track unit into a packet unit. As this recording format records information into a smaller packet unit, many files can be recorded in a CD-R disc as if such files are recorded in a floppy disc. The ④ program area may have a plurality of tracks which is more than two.

In the case of FIG. 11, the ④ program area consists of the ④-1 track #1 and this track #1 consists of three packets a ④-1-1 packet #1, a ④-1-2 packet #2, and a ④-1-3 packet #3.

Figure 12:
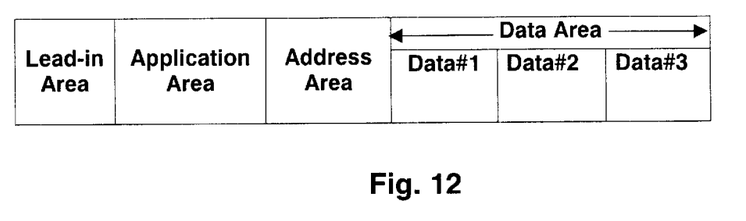
FIG. 12 is a diagram for explaining a third recording format in accordance with the fourth embodiment of the present invention.

FIG. 12 is a diagram for explaining a packet recording format for the PW format. In FIG. 12, the PW format has a structure of 32 user data blocks having a predetermined blocks preceding and succeeding the user data blocks such that a link block (1 block) and a run-in block (4 blocks) precedes the user data blocks, and a run-out block (2 blocks) succeeds the user data blocks. Each block is corresponding to 2 k-byte of a sector configuration of CD-ROM disc (thus, one block corresponds to a data amount of one sector).

The head link block (1 block) is for connecting with a run-out block in a preceding packet seamlessly and the subsequent run-in blocks (4 blocks) are run up portions for synchronizing with a sector of CD-ROM disc. The run-out blocks (2 blocks) are a protection area of the user data blocks for connecting with a subsequent link block seamlessly.

As shown in FIG. 11, the PW format records information in three packets (packet #1 through packet #3) and the lead-in information and lead-out information are recorded in the ③ lead-in area and the ⑤ lead-out area respectively by the finalization. The CD-R disc recorded and finalized by the PW format can be read by a CD-ROM disc drive.

Figure 13:
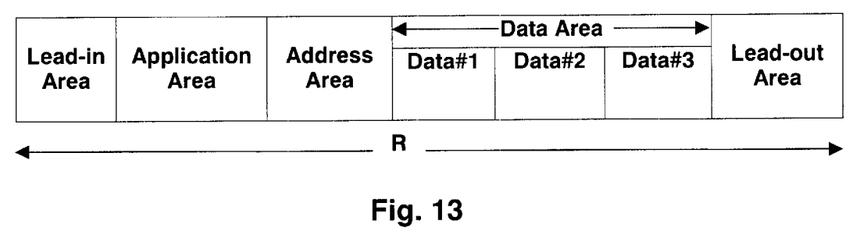
FIG. 13 is a diagram for explaining a first structure of an optical information recording medium in accordance with a fifth embodiment of the present invention.

FIG. 13 is a diagram for explaining an unfinished recording status of "before the finalization" in the PW format shown in FIG. 11 such that two packets are recorded but the last packet is not yet recorded before the finalization. In FIG. 13, before the finalization, an area and a packet shown by a dotted line (i.e. the ③ lead-in area, the ④-1-3 packet #3 and the ⑤ lead-out area) indicate that information is not recorded, and the packets shown by a solid line (i.e. the ④-1-1 packet #1 and the ④-1-2 packet #2) indicate that the information is recorded in these packets. In this state of a CD-R disc recorded by the PW format, the disc can not be read by a CD-ROM disc drive unless the disc is finalized such that lead-in and lead-out information is recorded in the ③ lead-in area and the ⑤ lead-out area respectively.

A CD-R disc, which can be read by a conventional CD-ROM disc drive, is required to have a structure of the area B as shown in FIG. 8. However, the area A typical for the CD-R disc can not be recognized by the CD-ROM disc drive.

Figure 14:
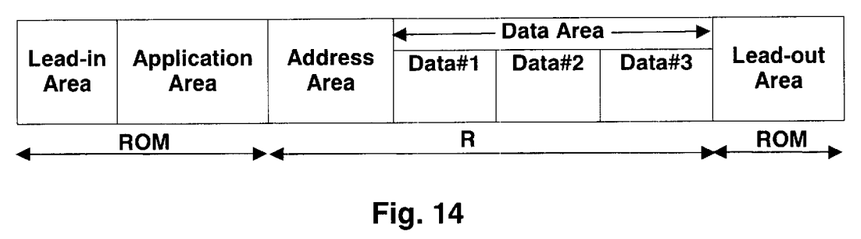
FIG. 14 is a diagram for explaining a second structure of an optical information recording medium in accordance with the fifth embodiment of the present invention.

FIG. 14 is a diagram for explaining problems of a CD-R disc, which is recorded in the PW format shown in FIG. 13 at the status of "before the finalization", wherein the CD-R disc can not be read by a CD-ROM disc drive.

The problem 1 shown in FIG. 14 is that the CD-ROM disc drive can not start a readout operation as it can not read the lead-in information. The CD-ROM disc drive firstly reads out summary information for the disc which is one of lead-in information such as the TOC (Table of Contents) in the ③ lead-in area. As the lead-in information can not be read from the ③ lead-in area of the CD-R disc at the status of "before the finalization" as shown in FIG. 13, the TOC information can not be readout and consequently, the lead-out operation stops.

The problem 2 shown in FIG. 14 is that a servo system for the CD-ROM disc drive becomes out of control when an optical pick-up proceeds to read a not recorded packet allocated immediately after the last packet recorded. As the optical pick up tries to read an area not recorded, the CD-ROM disc drive can not carry out a tracking servo signal or a CLV (Constant Linear Velocity) signal and the servo system becomes out of control. In other words, the CD-ROM disc drive can not recognize the last packet (in the case of FIG. 13, it is the ④-1-2 packet #2), which is recorded, in the CD-R disc recorded in the PW format before the finalization, and the servo system becomes out of control.

Thus, a CD-R recorder can lead-out information from the CD-R disc before the finalization wherein an information is recorded in the form of packet but the CD-ROM disc drive can not read out information from the same.

In a case of reading out information from the last packet shown in FIG. 13, as for a CD-R disc drive, it has a function to obtain a tracking signal and a CLV (Constant Linear Velocity) servo signal from the CD-R disc no matter the disc area (area B) is recorded or not. In this sense, the read out operation will continue as the tracking signal and the CLV servo signal can be obtained by the ATIP (Absolute Time In Pre-groove) signal pre-recorded in a serial groove of the CD-R disc. The recording operation for the packet can be continued for the next packet after the recording signal in the ultimate packet is confirmed.

As for the CD-ROM disc drive, it can not obtain information after reading out information from the ④-1-2 packet #2 that whether or not a recorded packet exists in the subsequent portion. The disc drive then tries to read out information from the ④-1-3 packet #3 which has no recorded information, and consequently, the servo system becomes out of control. Only then the ④-1-3 packet #3 is to be determined as a blank recording area.

As the CD-ROM drive tries to read out information from a blank recording area, the servo system such as the tracking servo and the CLV servo operations become out of control. If the disc drive becomes out of control, a computer which controls such the disc drive may be hang-up in some cases.

SUMMARY OF THE INVENTION

Accordingly, in consideration of the above-mentioned problems of the related art, an object of the present invention is to provide an optical information recording medium having a data format of which all recorded information throughout recorded packets from the head packet to the final packet can be lead-out by a CD-ROM disc drive even though a recordable area still exists in the optical information recording medium, wherein the optical information recording medium is recorded by using the recording format of the packet writing format of a CD-R disc.

In order to achieve the above object, the present invention provides, according to an aspect thereof, an optical information recording medium including a PCA area, a PMA area, a lead-in area, a program area, and a lead-out area in sequence for recording information in conformity with the CD-R packet writing format, the optical information recording medium further including a first area having the PCA area and the PMA area, and a second area having the lead-in area, the program area and the lead-out area, wherein the program area is composed of at least one track, wherein the track is composed of at least one packet, wherein the packet is composed of at least a user data block, an address block and a dummy block, and wherein the lead-in area is pre-recorded with at least an information related to a number of the track, a starting time of the track and a starting time of a read out operation prior to any recording, the optical information recording medium is furthermore characterized in that the address block in a last packet at a present recording session is recorded with an information representing an end of recording, and that the end of recording information recorded at a previous recording session is disabled from being lead-out, and that a packet having an address block, which can read out an end of recording information, is determined to be a last packet and a next recording session starts from a packet allocated immediately after the last packet.

Other object and further features of the present invention will be apparent from the following detailed description when lead-in conjunction with the accompanying drawings.

DETAILED DESCRIPTION OF THE PREFERRED EMBODIMENTS

[First Embodiment]

Figure 1:
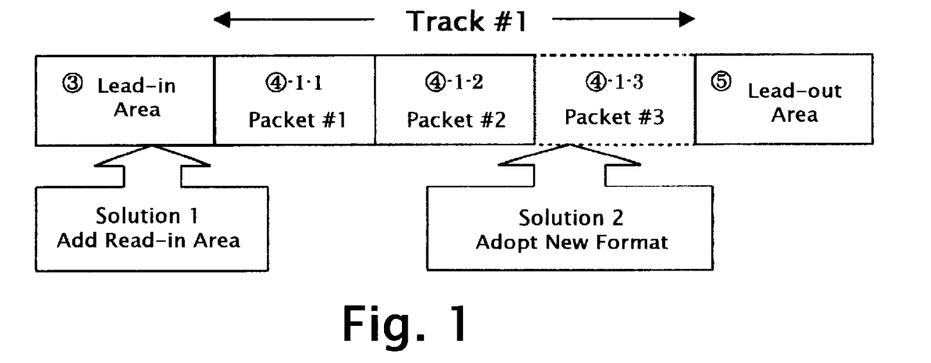
FIG. 1 is a diagram for explaining a first embodiment of the present invention.

FIG. 1 is a diagram for explaining a first embodiment of the present invention. This embodiment is to provide Solution 1 for the Problem 1 of the prior art and Solution 2 for the Problem 2 of the prior art described above.

The Solution 1 is to record a lead-in information in a ③ lead-in area before the start of recording by the packet writing (PW) format. In the meantime, a lead-out information is recorded in a ⑤ lead-in area as occasion arises.

Figure 2:
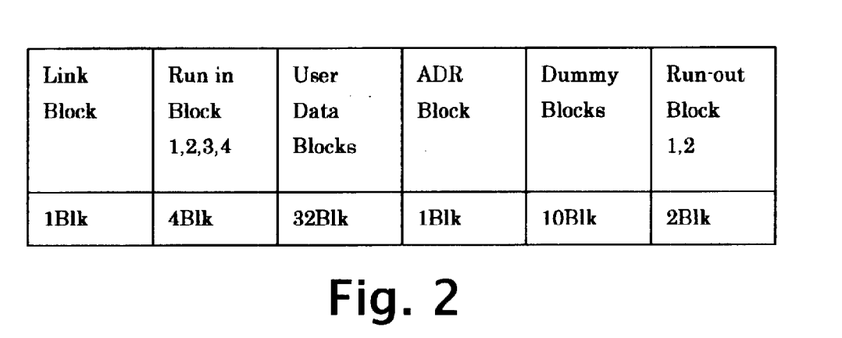
FIG. 2 is a diagram for explaining a recording format for packet in accordance with the first embodiment of the present invention.

FIG. 2 is a diagram for explaining a recording format for packet in accordance with the first embodiment of the present invention. In the case of FIG. 2, a single packet has 1 link block, 4 run in blocks, 32 user data blocks, 1 address block, 10 dummy blocks and 2 run out blocks.

The Solution 2 is to set a packet having a recording format shown in FIG. 2 to prevent an optical pickup from proceeding to lead-in/out operations in an area not recorded, i.e. a packet #3 in a case of FIG. 1. As a matter of convenience, a recording format shown in FIG. 1 has the same number of tracks and packets of the recording format shown in FIG. 13.

The Solution 1 will be described in a case of recording lead-in information in the ③ lead-in area. As to the Solution 1, a lead-in information to be recorded in the ③ lead-in area is a number of tracks, starting time of track, starting time of lead-out and a type of the track (such as audio or data), etc. In the first embodiment shown in FIG. 1, a number of tracks and a type of the track is 1 and a data track respectively.

The information of a number of packets and packet size do not directly impact the lead-in information but size of program area is a sum of the recording packet size and they have relation with lead-out starting time. The lead-out starting time can be measured by sum of the size of a pre-recorded packet or maximum recording capacity of a recording medium.

By utilizing the Solution 1, the lead-in information and the lead-out information are recorded in the ③ lead-in area and the ⑤ lead-out area respectively before the start of packet recording, and the Problem 1 described above can be solved.

The Solution 2 is to establish a new packet recording format shown in FIG. 2, which prevents an optical pickup from proceeding into an area not recorded (packet #3 in FIG. 1). This new recording format is recorded by the CD-ROM format.

The recording format shown in FIG. 2 is equivalent to the case of which the ADR (address) block and the dummy blocks are being inserted between the user data blocks and the run-out blocks shown in FIG. 12.

The address block is used for determining whether the packet in question is the last packet or not. The dummy block for the packet in question is inserted for preventing a laser beam of an optical pickup from being exposed into a unrecorded packet allocated immediately after the packet in question.

Figure 3:
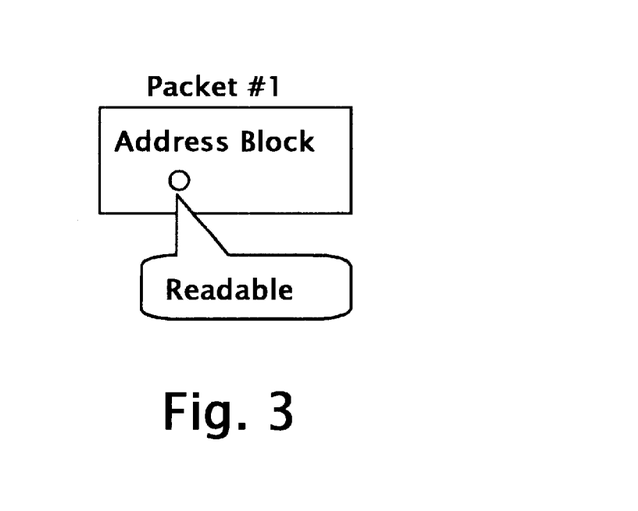
FIG. 3 is a diagram for explaining recording condition of an address block of a packet #1 for the top packet #1 at the first time recording by utilizing recording format shown in FIG. 2.

FIG. 3 is a diagram for explaining recording condition of an address block of a packet #1 for the top packet #1 at the first time recording by utilizing recording format shown in FIG. 2. The address block for the top packet #1 is recorded by a predetermined CD-ROM sector format as shown in FIG. 3. A number of times of recording a packet, a packet number or other information related to a packet recording can also be recorded in a user data area of the sector of the address block.

As the result, and as shown in FIG. 3, the sector data of the address block for the packet #1 is the predetermined CD-ROM format, and accordingly, the block is free from read out error by a CD-ROM disc drive. The circle (○) shown in FIG. 3 indicates that the block is free from error and is "readable".

In the second time recording of the packet in the recording format shown in FIG. 2, the packet #1 is also recorded simultaneously with recording of the packet #2 that the address block of the packet #1 is overwritten by a recording signal for CD such as an EFM (Eight to Fifteen Modulation) signal.

Consequently, the address block of the packet #1 is overwritten with the EFM signal twice that the sector structure becomes out of specification of the format that the sector structure changes and becomes unreadable by the CD-ROM disc drive.

Figure 4:
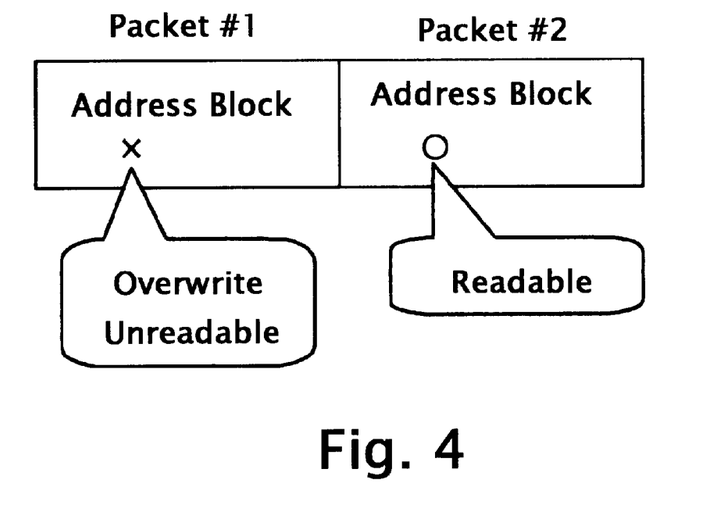
FIG. 4 is a diagram for explaining recording condition of an address block of packet #1 and #2 for the second time recording the top packet #1 and the next packet #2 by utilizing recording format shown in FIG. 2.

FIG. 4 is a diagram for explaining recording condition of an address block of the packet #1 and #2 for the second time recording the top packet #1 and the next packet #2 by utilizing the recording format shown in FIG. 2. In FIG. 4, the address block of the packet #1 becomes unreadable for the CD-ROM disc drive which is indicated by a cross mark (×). The address block for the packet #2 is recorded by the recording format shown in FIG. 2 which is readable and indicated by a circle (x).

In the third time recording of the packet in the recording format shown in FIG. 2, the packet #2 is also recorded simultaneously with recording of the packet #3 such that the address block of the packet #2 is overwritten by the EFM signal.

Consequently, as same as the case of the packet #1, the address block of the packet #2 is overwritten with the EFM signal twice such that the sector structure becomes out of specification of the format and becomes unreadable by the CD-ROM disc drive.

Figure 5:
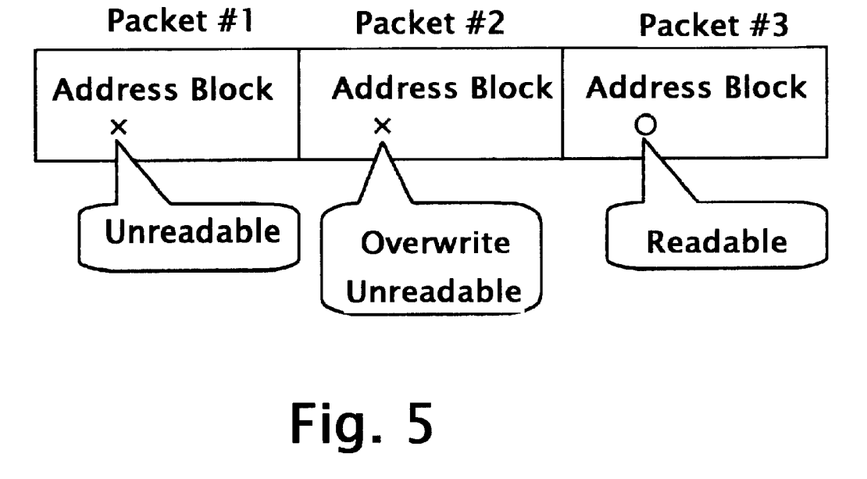
FIG. 5 is a diagram for explaining recording condition of an address block of packet #1 through packet #3 for the third time recording the last packet #3 by utilizing recording format shown in FIG. 2.

FIG. 5 is a diagram for explaining recording condition of an address block of a packet #1 through a packet #3 for the third time recording the last packet #3 by utilizing the recording format shown in FIG. 2. In FIG. 5, the address block of the packets #1 and #2 become unreadable and are indicated as (x). The address block for the packet #3 is recorded by the recording format shown in FIG. 2 such that it is readable and indicated as (○).

As described above, the first embodiment of the present invention provides the packet recording that only the address block of the last packet recorded (i.e. the packet #3) becomes readable and all packet before the last (i.e. the packets #1 and #2) becomes unreadable. Accordingly, the CD-ROM disc drive reads the address packet from the top and determines the last packet which address block becomes readable.

The read out operation described above can detect the last packet by reading in the address block. In other words, the CD-ROM disc drive reads the address block for each packet and detects a packet which is readable (○) (i.e. the last packet). However, it is not sufficient for an actual CD-ROM disc drive because the tracking and CLV servo of the optical pickup of the CD-ROM disc drive requires to be locked for a while after reading out various information from the last packet, and for this reason, reading out the EFM signal is required approximately for one circle of the disc to lock the tracking servo and CLV servo.

As for the recording format described in FIG. 2, the servo system for the CD-ROM disc drive does not become out of control as 10 dummy blocks are inserted after the address block. An information to be recorded in the dummy blocks is the predetermined CD-ROM sector format.

[Second Embodiment]

Figure 6:
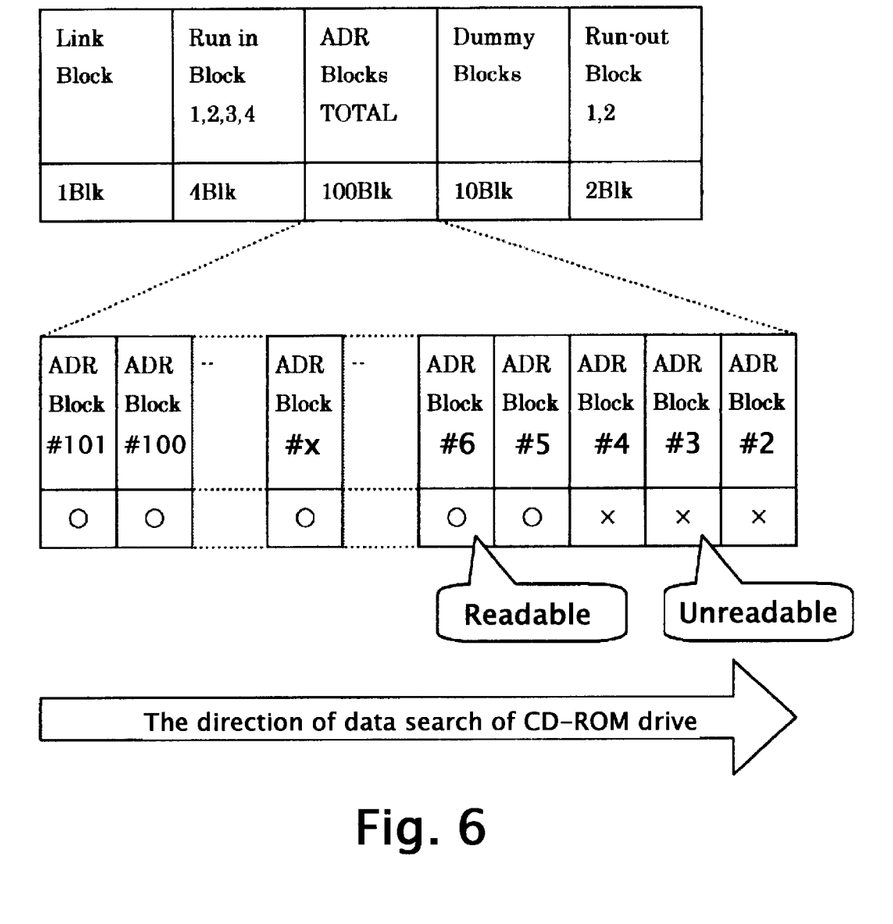
FIG. 6 is a diagram for explaining recording condition of an address block in the recording format for packet #1.

FIG. 6 is a diagram for explaining recording condition of an address block in the recording format for the packet #1 according to a second embodiment of the present invention. FIG. 6 shows a format of the top packet #1 for the second embodiment, except for the user data block shown in FIG. 2 of the first embodiment, and it shows an enlarged view of the portion of address block which is called "address block total". A number of blocks is a number of recordable packets. The second embodiment of the present invention is to put all address blocks for every packet in the top packet #1 to speed up an access to data.

Figure 7:
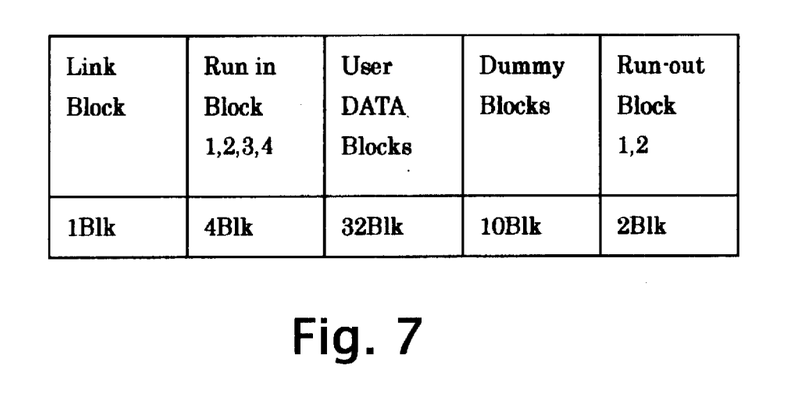
FIG. 7 is a diagram for explaining each address block for every packet except for top packet #1 is not necessary.

FIG. 7 is a diagram for explaining a recording format of packet other than the top packet #1. A method to overwrite data for the address block is the same as the first embodiment described above. As shown in FIG. 7, the packet other than the packet #1, i.e. the packets #2, #3 and above have no address block in comparison with the recording format shown in FIG. 2.

In a case of FIG. 6, the address block total is composed of one hundred and one (101) blocks with indicating that 101 packets can be recorded. The packets #2 through #5 are recorded and remaining packets #6 through #101 are unrecorded.

The second embodiment is characterized by the order of each packet address block in the address block total. The packet #100 comes at the top of the address blocks, and remaining packets come in decline numeric order such that the packet #1 is allocated in the last and recorded first. This is caused by that a CD-ROM disc drive can read out data from a block without an error faster but takes more time to read out data from a block with an error, and resulting in more than 10 times longer than that of the block without an error.

If a CD-ROM disc drive tries to read in the packet recording format shown in FIG. 2, it tries to detect every packet from the top in sequence one by one as described in the first embodiment, and it takes considerable amount of time to check through the last recorded packet as long as a number of packets becomes larger. On the contrary, by utilizing the second embodiment, the last packet can be checked in a short period of times because all packets preceding the last one have no error.

[Third Embodiment]

This embodiment is to provide a method for shortening a readout operation of an address block after overwritten, i.e. the address block unreadable (x), for the recording format as described above. Each address block constituting the address block total described in the second embodiment is one block (one sector length). As described below, the block has a predetermined number of data, for example, 2048 data. Information in the address block is recorded on a recording medium with a predetermined value or a correct value, which will be mentioned later, with dispersed by the interleave format such as CIRC (Cross Interleaved Reed-Solomon Code) typical for CD recording.

When the packet is recorded, only a certain data in the block is re-recorded as unreadable (x) but not all 2048 data will be re-recorded as unreadable (x).

In order to re-record data by overwriting readable (○) data, which is recorded with dispersed by the interleave format per each block, as unreadable (x) data, it is necessary to minimize a size of EFM (eight to fifteen modulation) signal for overwriting in conjunction with shortening a period of time for processing an error correction code (CIRC, EDC or ECC) for overwriting.

FIG. 8 is a diagram for explaining a data structure of an address block before overwriting operation in accordance with a third embodiment of the present invention. FIG. 9 is a diagram for explaining a data structure of an address block after overwriting operation in accordance with the third embodiment of the present invention.

As shown in FIGS. 8 and 9, an address block constituting the address block total is described as Data #1 through Data #n, for example, in a case of n=2048, a number of total data is 2048. In the case of FIGS. 8 and 9, each Data has a predetermined value that a cross mark (x) indicates that the Data has a different value from the predetermined value which is "unreadable" and a circle mark (○) indicates that the Data is the predetermined value which is "readable".

FIG. 8 indicates that all address blocks can be read out by a CD-ROM disc drive. After the process of overwriting, in the case of FIG. 9, the Data #2, #3 and #5 through #n are being overwritten that the unreadable data and readable data are mixed in the address block. If the Data #1 through #n are read out in such a mixed condition, readable (○) data can be read out as a correct value without error. However, unreadable (x) data can not be read out as a correct value because the unreadable (x) data contain an error.

By recording the predetermined value and detecting the same, the Data can be determined whether it is "unreadable" or "readable". In connection with the predetermined value, it can be a sector address number, a value of no error portion or any other predetermined value. As a result, such Data is recorded in a predetermined area of the address block and detected as it is so that the "unreadable" block can be easily detected by checking the Data in the address block whether or not it is the predetermined value instead of detecting the entire address block. Consequently, the time of detecting unreadable block can be shortened, for 10 times faster that detecting the entire address block.

[Fourth Embodiment]

This embodiment is to provide a structure of recording format for an optical information recording medium including an application information in conformity with the CD-ROM format. FIG. 10 is a diagram for explaining a first recording format in accordance with a fourth embodiment of the present invention. In FIG. 10, a first recording format is related to FIGS. 6 and 7 and is composed of a lead-in area, a program area (track #1) and a lead-out area. The program area includes an application area, an address area and a data area.

The lead-in and out areas and the address area is the same as described above. The address area is technically the same as the address block total described above and the status of an address block ("readable" or "unreadable") is integrated and recorded in this area. The application area is an area for recording software, which controls to read in and out data, in the data area (Data #1 through #3).

FIG. 11 is a diagram for explaining a second recording format in accordance with the fourth embodiment of the present invention. The second recording format is basically the same as the first recording format described in FIG. 10 but it includes a blank area allocated immediately after the Data #3 in the data area. The blank area has no information recorded by the EFM method that it may be used for a reserved area for scalability of the recording format. In addition, the blank area can be used for a recognition information inherent for such the medium by detecting the existence or the size thereof. Further, the blank area can also be used for copy protection that any attempt to copy the medium including the blank area fails because the copying operation (for example, a servo control) will go out of control when it tries to copy the blank area with no information. As described above, the packet recording in accordance with the present invention includes the dummy block shown in FIG. 7, so that an optical pick-up for a CD-ROM disc drive will not proceed to read in the blank area when the disc drive is reading the last recorded Data #3. This enables the structure of recording format shown in FIG. 11.

FIG. 12 is a diagram for explaining a third recording format in accordance with the fourth embodiment of the present invention. The third recording format is basically the same as the first recording format described in FIG. 10 except that it has no lead-out area. As described above, the packet recording in accordance with the present invention includes the dummy block shown in FIG. 7, so that an optical pick-up for a CD-ROM disc drive will not proceed to read in a blank area in the recording medium when the disc drive is reading the last recorded Data #3. This enables the structure of recording format shown in FIG. 12.

As explained in the second recording format in the fourth embodiment, the third recording format can also be used for recognition of the medium by detecting the existence of the lead-out area. Further, the third recording format also has an advantage of copy protection that any attempt to copy this recording format will be fail that the copying operation (for example, a servo control) will go out of control that the recording format has no lead-out area.

[Fifth Embodiment]

FIG. 13 is a diagram for explaining a first structure of an optical information recording medium in accordance with a fifth embodiment of the present invention. The fifth embodiment is to provide a first structure of the recording medium constructed on a CD-R recording medium.

A CD-R recording medium is composed of a (basal plate) substrate engraved with a spiral track groove and the substrate is laminated with a color (pigment) layer, a reflection layer and a protection layer in sequence. As to the color layer, a light transmittance decreases irreversibly as a light beam having a certain level of power is exposed to the color layer.

A recording medium having a structure mentioned above, i.e. a CD-R recording medium, will have the same structure as explained below and be shown in FIG. 14 by recording a necessary information in the lead-in area, the application area and the lead-out area. Further, a recording medium having a structure of CD-R medium will have the same structure as explained below and be shown in FIG. 15 by recording necessary information in the lead-in area and the lead-out area.

The recording medium having a structure shown in FIG. 13 is preferable for an application which the time of recording packets in the data area, a size of the packet are not fixed. In other words, the recording medium of this type can be used for any application that it can be used for general-purpose.

Further, as the recording medium is constructed in conformity with the CD-R recording medium and a partition of each data recording capacity can be arbitrarily assigned within an extent of capacity of all program areas in response to capacity of application, a number of data areas, and capacity of each area, it can provide higher productivity with less cost. In addition, the recording medium can be manufactured in one type, so that there is a benefit of a controlled production for an administrative purpose.

FIG. 14 is a diagram for explaining a second structure of an optical information recording medium in accordance with the fifth embodiment of the present invention. The second structure of the recording medium is a hybrid type wherein the lead-in and lead-out areas and the application area have the CD-ROM structure (a pit and land recording), and the address area and the data area have the CD-R structure, so that the recording medium can be manufactured for specific use. This type of structure is preferable for specific use wherein a number of recording times for the packet and size of the packet are already fixed.

Figure 15:
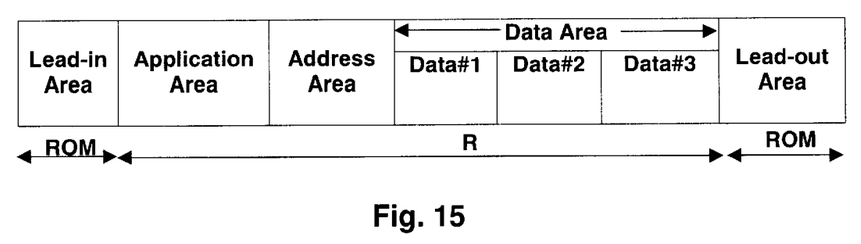
FIG. 15 is a diagram for explaining a third structure of an optical information recording medium in accordance with the fifth embodiment of the present invention.
Figure 16:
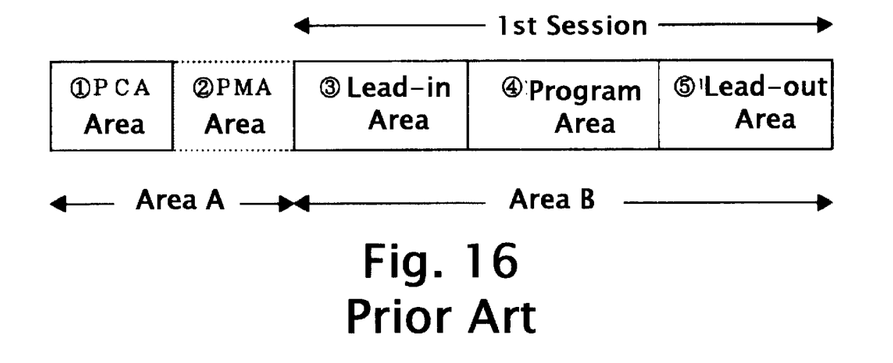
FIG. 16 is a diagram showing a recording format of DAO according to the prior art.
Figure 17:
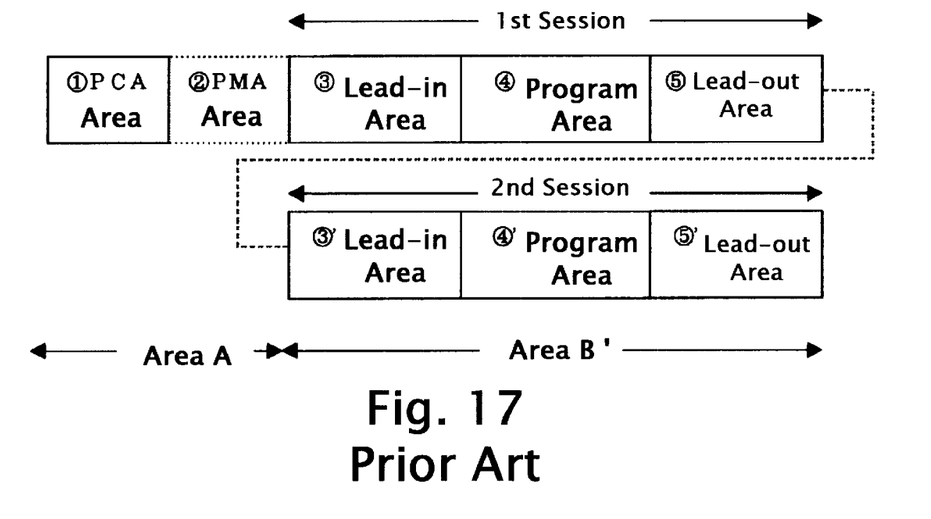
FIG. 17 is a diagram showing a recording format of SAO according to the prior art.
Figure 18:
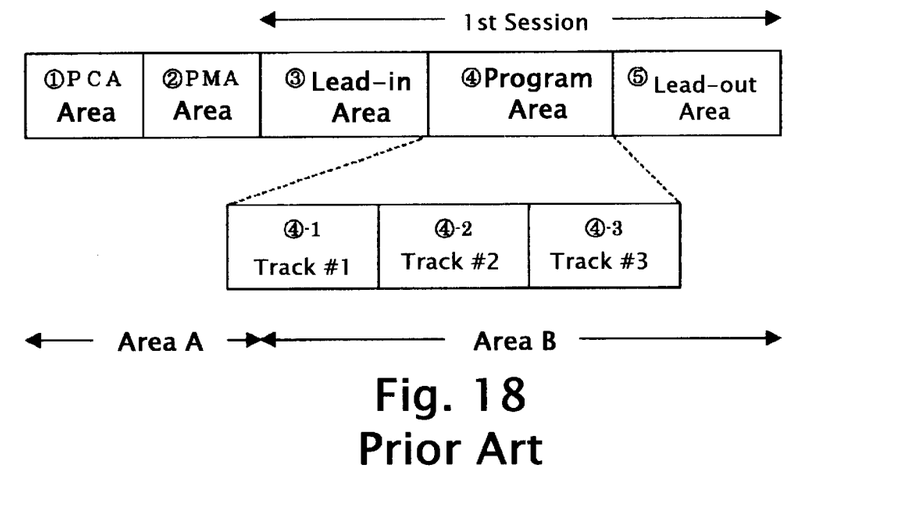
FIG. 18 is a diagram showing a recording format of TAO according to the prior art.
Figure 19:
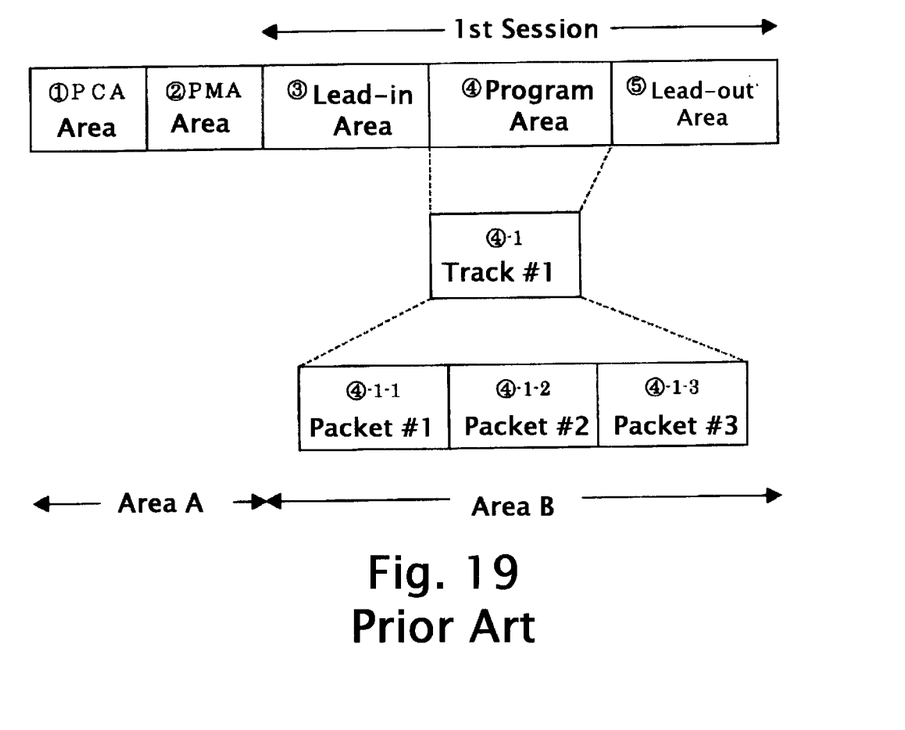
FIG. 19 is a diagram showing a recording format of PW according to the prior art.
Figure 20:
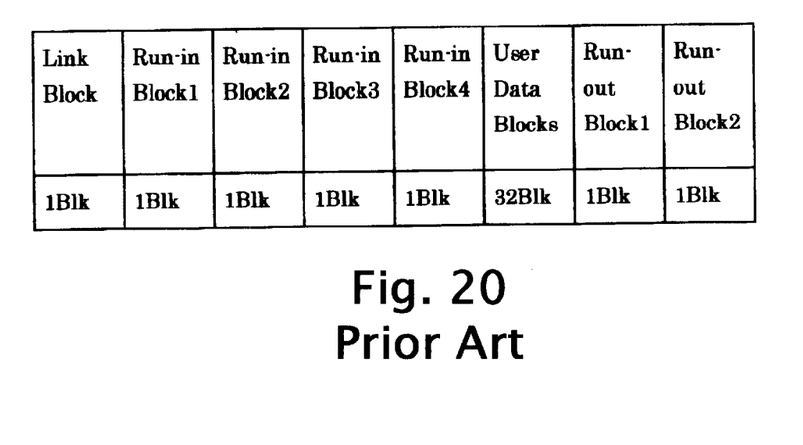
FIG. 20 is a diagram showing a recording format for a packet of PW format according to the prior art.
Figure 21:
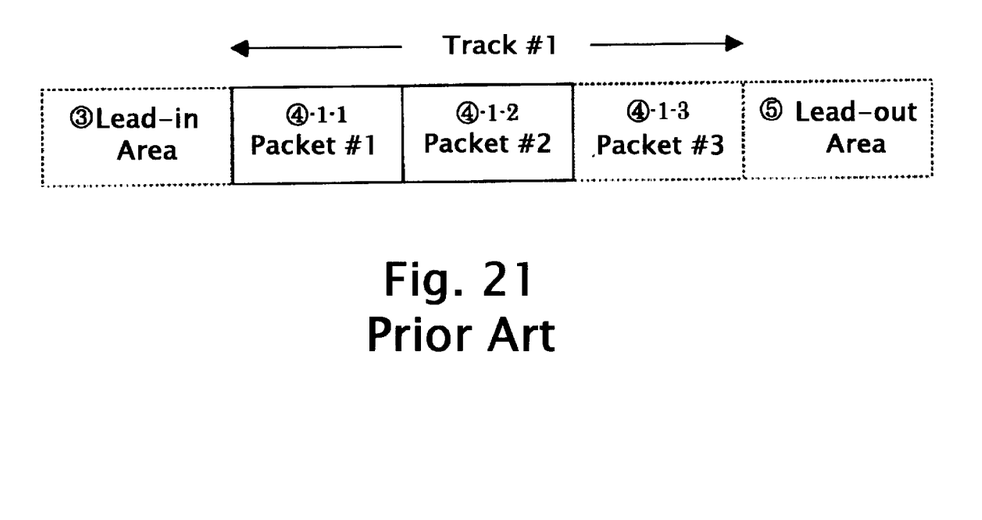
FIG. 21 is a diagram for explaining an unfinished recording status before a finalization of PW format according to the prior art.
Figure 22:
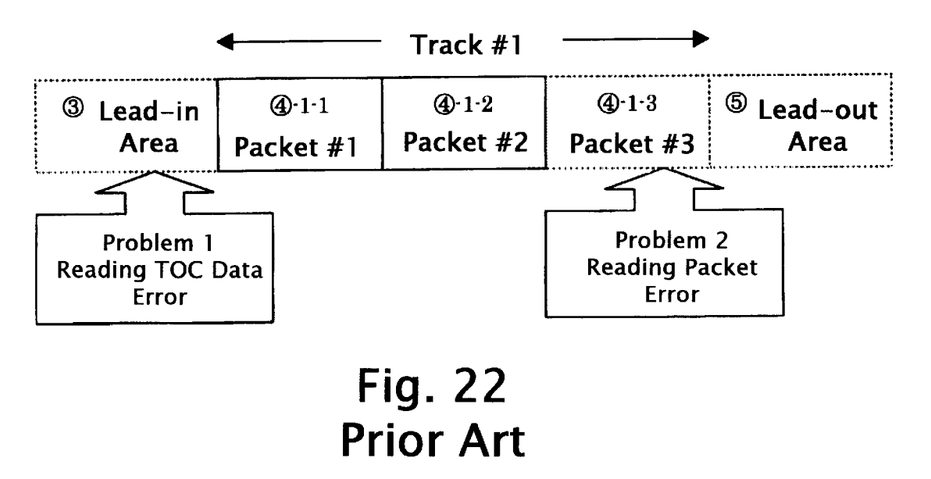
FIG. 22 is a diagram for explaining problem of the CD-R disc being recorded in PW format shown in FIG. 21 at the status of before the finalization can not be read out by CD-ROM drive.

FIG. 15 is a diagram for explaining a third structure of an optical information recording medium in accordance with the fifth embodiment of the present invention. The third structure of the recording medium is a hybrid type wherein the lead-in and lead-out areas have the CD-ROM structure and the application area, the address area and the data area are have the CD-R structure. This type of recording medium is preferable for specific use wherein a specification for the program area is already fixed.

FIGS. 13, 14 and 15 indicate that the recording format shown in FIG. 10 is used for the first to third structure described in the fifth embodiment but the recording format shown in FIGS. 11 and 12 can also be utilized.

While the invention has been describe above with reference to specific embodiments thereof, it is apparent that many changes, modifications and variations in the arrangement of equipment and devices and in materials can be made without departing from the invention concept disclosed herein. For example, the address block of the packet #1 includes a number of blocks as the same numbers as a number of recordable packets succeeding the packet #2, but the address block of the packet #1 include an address block for packet recordable. As the present invention has been described as an example of CD-R recording medium or a hybrid type CD-R recording medium which are in conformity with the specification of CD, but it is obvious that the present invention can be utilized for other disc type recording medium such as a recordable digital versatile disc (DVD-R).

According to an aspect of the present invention, there provided an optical information recording medium which can be read out recorded packet information by a CD-ROM disc drive at the time when the disc drive overwrites information under the packet recording format for the CD-R disc even before the finalization procedure of packet recording.

According to another aspect of the present invention, there provided an optical information recording medium of which recorded information of the packet can be lead-out immediately by a CD-ROM disc drive associated with a computer or other apparatus, so that the recorded information can be utilized by other CD-ROM disc drive associated with computer at any place, for example, retrieving information in the optical information recording medium from a CD-ROM disc drive associated with computer at any place or distributing information in the optical information recording medium from a CD-ROM disc drive associated with computer at any place through internet.

What is claimed is:

1. An optical information recording medium comprising a PCA area, a PMA area, a lead-in area, a program area, and a lead-out area in sequence for recording information in conformity with the CD-R packet writing format, the optical information recording medium further comprising:

a first area having the PCA area and the PMA area; and a second area having the lead-in area, the program area and the lead-out area, wherein the program area is composed of at least one track, wherein the track is composed of at least one packet, wherein the packet is composed of at least a user data block, an address block and a dummy block, and wherein the lead-in area is pre-recorded with at least an information related to a number of the track, a starting time of the track and a starting time of a read out operation prior to any recording, the optical information recording medium is furthermore characterized in that the address block in a last packet at a present recording session is recorded with an information representing an end of recording, and that the end of recording information recorded at a previous recording session is disabled from being lead-out, and that a packet having an address block, which can read out an end of recording information, is determined to be a last packet and a next recording session starts from a packet allocated immediately after the last packet.

2. The optical information recording medium as claimed in claim 1, wherein an address block of the first packet comprises a plurality of blocks of which a number is the same as a number of recordable packets succeeding the second packet.

3. The optical information recording medium as claimed in claim 1, wherein the end of recording information recorded in the address block of the last packet at the previous recording session is overwritten by a predetermined signal.

4. The optical information recording medium as claimed in claim 1, wherein an information to be recorded in the dummy block relates to a tracking servo operation in a driving apparatus to be able to continue for a predetermined period of times starting after reading the address block of the last packet.

5. The optical information recording medium as claimed in claim 1, further comprising an address area in the program area, wherein an information for detecting a unreadable packet and a readable packet is recorded.

6. The optical information recording medium as claimed in claim 1, further comprising an application area in the program area, wherein the application area is recorded with an application software for controlling read out operation of an information to be recorded in the packet.

7. The optical information recording medium as claimed in claim 1, wherein the recording medium is composed of hybrid construction of a CD-ROM portion and a CD-R portion, wherein a predetermined information is recorded in the CD-ROM portion and an optional information is recorded in the CD-R portion.

* * * * *